United States Patent [19]

Goto

[11] 3,999,576
[45] Dec. 28, 1976

[54] METHOD FOR MANUFACTURING TUBULAR SLEEVE

[76] Inventor: Yoshitaka Goto, 77, 1-chome, Kumano-cho, Kariya, Aichi, Japan

[22] Filed: May 22, 1975

[21] Appl. No.: 579,934

[52] U.S. Cl. .................................. 138/103; 72/379; 72/384; 72/394; 113/116 Y; 113/116 J; 138/178

[51] Int. Cl.² ........................................ F16L 55/00

[58] Field of Search ............ 72/343, 379, 380, 381, 72/384, 394–397; 113/120 K, 120 UE, 116 DD, 116 Y, 116 J, 116 F, 117; 138/103, 178

[56] References Cited

UNITED STATES PATENTS

| | | | |
|---|---|---|---|
| 1,991,642 | 2/1935 | Turnquist | 72/384 X |
| 2,092,255 | 9/1937 | Keller | 72/384 X |
| 3,348,511 | 10/1967 | Cowles | 113/117 |

*Primary Examiner*—Victor A. DiPalma
*Attorney, Agent, or Firm*—Robert E. Burns; Emmanuel J. Lobato; Bruce L. Adams

[57] ABSTRACT

A tubular sleeve for use in a headlight assembly and the like and the method of manufacturing it. A strip blank is punched out of metal sheets or coiled strips. The blank has a straight edge along the lengths thereof and an arcuate edge opposite to the straight edge symmetrical relative to a plane passing through the center of the strip blank transversely thereof. The blank has opposite ends having straight edges substantially parallel to the plane. The strip is bent or rolled into a tubular split-sleeve configuration and then a marginal edge portion along the arcuate edge is flared outwardly with a varying taper. The flare is then further bent to form a flange normal to the sides of the body of the split-sleeve. A ring is formed on the flange extending generally toward the straight edge by offsetting a marginal edge portion of the flange. The edges of the split-sleeve along the split are joined to form a closed tubular sleeve.

3 Claims, 16 Drawing Figures

MA e, 23, MB

MC

MD

ME

MF

MG, 14

MH, 15

METHOD FOR MANUFACTURING TUBULAR SLEEVE

FIELD OF THE INVENTION

This invention relates to the manufacturing process for eccentric hollow frames having flanges on their indefinite shape edges.

BACKGROUND OF THE INVENTION

Generally the existing process for manufacturing products of flanged hollow frames is as follows.

First, a circle is punched out from a sheet of plate. Second, by reducing this circular plate placing it horizontally on the press, a flanged cylinder is formed. Third, the bottom of this cylinder is punched out and the edge remained at the circumferential edge of the punched bottom hole is straightly expanded or removed. In addition, the flange section formed with the preceding process is cut to the prescribed flange size and is further finished to the prescribed flange shape via bending work.

Therefore, with the existing process, material loss due to the trimming of flange and bottom sections as mentioned above and due to making allowance for reducing work, particularly when reducing eccentric hollow frame has made the process noticeably disadvantageous, and the requiring of much time and effort for working has been uneconomical. Moreover, with the preceding process, not to mention of eccentric hollow frames, manufacturing of those tapering in cylindrical section is further beset with difficulties.

SUMMARY OF THE INVENTION

The first object of this invention is to provide a manufacturing process for eccentric hollow frames having flanges on their indefinite shape edges like an obliquely crossed cylinder.

A second object of this invention is to provide an easy and economical manufacturing process for eccentric hollow frames.

A third object of this invention is to provide a reduction of the manufacturing process.

A feature of this invention is to make the plate which has been cut in prescribed unfolded shape to be solid by jointing both curled ends after step by step bending the plate to have a flange under the curled condition for several times. Advantages of this invention are as follows:
1. By previously punching the material an unfolded plate, material sizing can efficiently be carried out to make the loss to the minimum.
2. Because of its few number of working, manufacturing cost can be reduced.
3. Even an edge of complex shape can easily be transformed to the flange and no crease is found in the products.
4. Manufacturing equipment can simply be installed.

Other features and advantages of this invention will be described in more detail with drawings.

DESCRIPTION OF THE PREFERRED EMBODIMENTS

The process of said invention is to keep a cylindrically curled plate which has previously been punched out to the unfolded shape for the products of eccentric hollow frames or sleeves in the die, to press the edge of this cylindrical material in the direction of the axis step by step to form the prescribed shape flange and to make this material to be solid by jointing both curled ends with an appropriate means.

Figure 5:
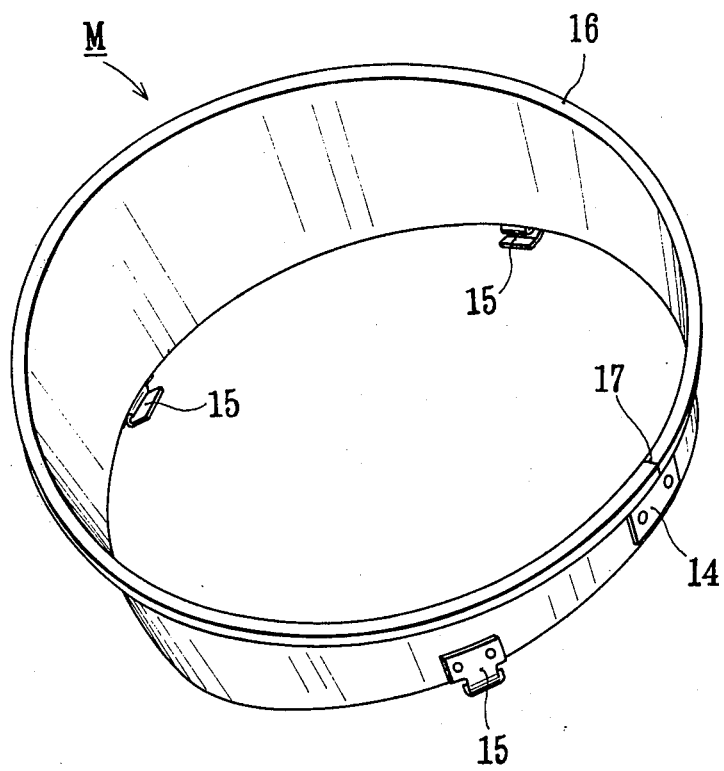
FIG. 5 is a perspective view of external appearance showing an example of the eccentric hollow frame obtained with the process of this invention.

FIG. 5 shows a headlight cover M for a car as an example of the eccentric hollow sleeve or frame. The end section of one side makes a circle and that of the other side makes an ellipse by being obliquely cut toward the axis. For the circumferential edge of this elliptical shape end section, a bent to channel type flange 16 is circumferentially set while, for that of the circular end section, retainers 15 are riveted.

The butt-end 17 of the headlight cover M is spot welded through a rivet holder 14.

Figure 1:
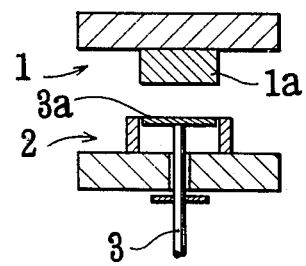
FIG. 1 is a diagrammatic cross section view of a press to punch out unfolded shape material for eccentric hollow frames.

FIG. 1 shows the device for punching out the unfolded shape material of products, in which an upper die 1 of the press which has the die 1a of punching out the prescribed unfolded shape from the material and a lower die 2 has a cradle 3a supported by a rod 3 connected with the fluid pressure or spring at the descending position of the die 1a.

FIGS. 2A to 4A show devices for transforming and working flanges step by step. Under the lower surface of the descending die plate 1A, a cylindrical shape upper die 18 is lapped.

A lower end circumferential edge of the upper die 4 forms the inclined extruding surface 19 having an inclined elliptical shape surface toward the axis of the upper die for transforming the flange into the first step shape and the guide block 6 loaded in the upper die 4 extends outwardly past the inclined extruding surface 19.

A lower die extrudedly set on the fixed die plate 20, on which the chamber 21 for inserting the guide block 6 of the upper die and the curled material is set and, on the upper surface of which the inclined concave surface 22 of the same elliptical degree for receiving the inclined extruding surface 19 of the upper die 4 is concavely lapped.

Figure 3A:
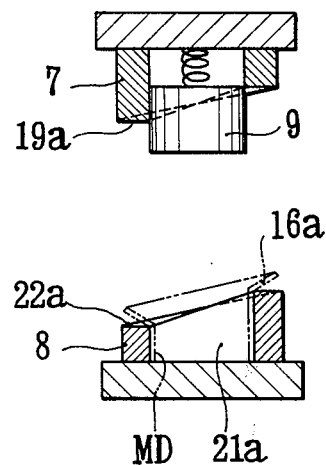
FIG. 3A is a diagrammatic cross section view of second stage flange bending device.

FIG. 3A shows the device for shaping second step flanges by transforming them horizontally, in which: sign 7 shows the ascending and descending upper die, 19a shows the horizontally extruding surface having the same elliptical degree with the former, 9 guide block, 8 the lower die, 21a the chamber and 22a the horizontally receiving surface.

Figure 4A:
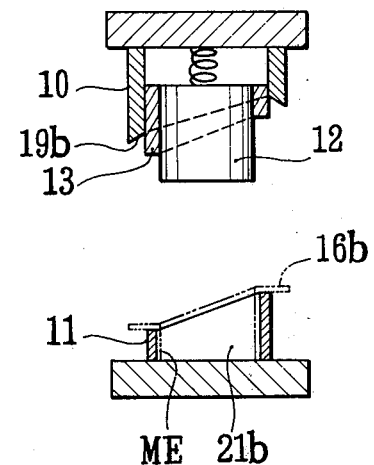
FIG. 4A is a diagrammatic cross section view of a third flange bending device.

FIG. 4A shows the device for finishing flanges to the final shape, in which the lower end of the ascendable and descendable upper die has the same elliptical degree with the former die, the lower end circumferential edge forms the inclined concave surface 19b for bending flanges downward and, inside the upper die 10, the slide guide 13 having the inclined elliptical shape surface and the guide block 12 fixed inside this slide guide are loaded.

The upper end edge of the lower die 11 has a horizontally receiving surface and has the surface of the same elliptical degree with the preceding respective dies.

Figure 6:
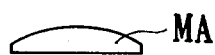
FIGS. 6A to 6H are illustrations showing the material working process relating to the process of said invention.
Figure 6:
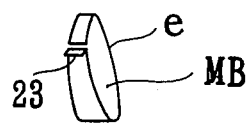
Figure 6:
Figure 6:
Figure 6:
Figure 6:
Figure 6:
Figure 6:
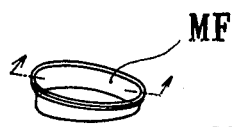
Figure 6:
Figure 6:
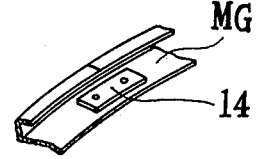
Figure 6:
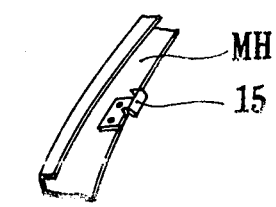

Next, the manufacturing process of said invention will be described in accordance with FIG. 6 separating respective processes.

1. External cutting (FIG. 1 and 6A)

Iron plate rolled like a coil is forwarded on the cradle 3a of the lower die 2 of the press and punched out in a unfolded shape plate MA for the eccentric hollow frame like an obliquely cutting shape of a cylinder by descending of the upper die 1. By ascending of the rod 3 the plate MA on the cradle 3a is ejected and taken out.

2. Curling (FIG. 6B)

The end joint section of the strip plate is held by the curler (not illustrated) and curled or rolled to a cylindrical shape material MA. By this process, the plate is transformed into a cylinder having a circle at one end and an ellipse at the other end.

3. Cutting-off of joint end section (FIG. 6C)

The material MB having a holding allowance 23 for the joint section is cut and worked to the desired size and shape by pressing.

4. Bending of flange section

By multiple-step of pressing, the flange section is bent along the gradient tangent of the cylinder. This process will be described in more detail.

Figure 2A:
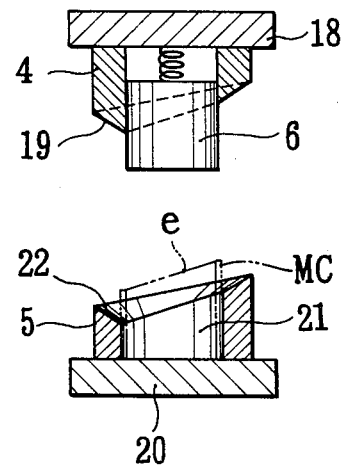
FIG. 2A is a diagrammatic cross section view of the first step flange bending device.
Figure 2B:
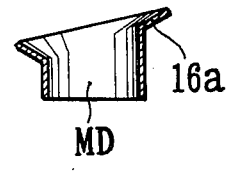
FIG. 2B is a diagrammatic cross section view of the material obtained with the first step flange bending device.

4-1. First-step bending (FIGS. 2 and 6D)

Material MC, curled and shaped its joint end is inserted into chamber 21 of the lower die 5 of the first-step flange bending device. The elliptical surface formed with the gradient tangent e of material MC and that formed with the inside diameter of the gradient concave surface are located to be parallel. This is common to the following flange bending steps. Under this condition, with the descending of die plate 18, guide block 6 enters into the material and expands the circumferential edge outward. Entering into this expanded circumferential edge section, the gradient extending surface 19 further expands it outward with the gradient concave surface 22 and works it to material MD, the shape of extruding flange 16a outward. In this case, the gradient of the first flange 16a depends upon the gradient of the gradient concavo-convex surfaces 19 and 22 of the upper and lower dies, but about 60 degree is appropriate.

Figure 3B:
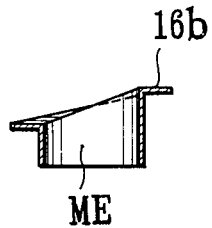
FIG. 3B is a cross section view of the material worked with second stage flange bending device.

4-2. Second-step bending (FIGS. 3 and 6E)

The preceding material MD is inserted into chamber 21a of the lower die 8 of second-step flange bending device and held and slided by guide block 9 with the descending of the upper die 7 and shaped to cylinder ME having second flange 16b which is transformed from the first flange 16a by bending it 90° outward.

Figure 4B:
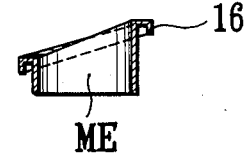
FIG. 4B is a cross section view of the material obtained with third flange bending device.

4-3. Third-step bending (FIGS. 4 and 6F)

Further cylinder ME is inserted into the lower die chamber 21b of third-step flange bending device. Where second flange 16b extends horizontally from the receiving surface of the lower die 11. With the descending of the upper die 10, the material is held by guide block 12 and the extruding section 16b is bent perpendicularly and shaped to cylinder MF having a sectional channel type flange 16 by the gradient concavo-covex surface 19b. When applying pressure with the upper die, since cylinder ME is securely located by guide block 12 and slide guide 13, the prescribed flange shape can be obtained without making deviation.

5. Jointing of end section (FIG. 6G)

Exactly uniting its joint section with a locating jig, material MF having a channel type flange is jointed by spot welding with rivet holder 14 applied outside. MG.

6. Welding of retainers (FIG. 6H)

Spot welding retainer 15 at any place of the lower edge of the cylinder, retainer attaching work MH is completed.

7. Buffing (FIG. 5)

After being buffed by buff lace, products MH become finished goods, headlight covers.

The preceding manufacturing process has been described about headlight covers for cars, but it can be applied to manufacturing of any shape of eccentric hollow cylinder.

With the existing process, until obtaining the first-step flange bending work, the following six steps have been required: (1) material → circular blank → (2) reducing work (flanged cylinder with bottom) → (3) punching out bottom → (4) sizing and trimming of punched bottom hole → (5) sizing and trimming of flanged section → (6) first-step flange bending, whereas with the process of said invention, since the material for eccentric hollow frames is previously punched out in unfolded shape plate and curled, until obtaining the first flange, the process requires only three steps as follows: material (1) → unfolded shape plate (2) → curled (3) → the first-step flange bending. In addition, the process of said invention can, of course, be applied not only to cylindrical shape but also to prismatic shape, polygonal prism and any tubular shape.

I claim:

1. A method of manufacturing a tubular sleeve comprising, punching a metallic strip blank having a straight edge along the length thereof and an outwardly arcuate edge opposite to the straight edge symmetrical relative to a plane passing through the center of the strip blank transversely thereof, the strip blank having opposite ends having straight edges substantially parallel to said plane, bending the strip blank into an open-ended tubular split-sleeve configuration, flaring outwardly a marginal edge portion of the strip blank having the arcuate edge to develop a circumferential flare on the split-sleeve, bending the flared marginal edge portion to define an outwardly extending flange circumferentially of the split-cylinder and substantially normal to the sides of the body of the split-sleeve, offsetting a marginal edge portion of the flange to define a rim normal to the flange and extending generally in a direction toward the straight edge of the split-sleeve, and joining the end portions of the split-cylinder to form a closed tubular sleeve.

2. A method of manufacturing a tubular sleeve according to claim 1, in which said flare has a configuration varying taper, said taper having an angle varying relative to the body of the split-sleeve.

3. A tubular sleeve made in accordance with the method of claim 1.

* * * * *